(12) United States Patent
Kain

(10) Patent No.: US 11,640,536 B2
(45) Date of Patent: May 2, 2023

(54) ARCHITECTURE SEARCH WITHOUT USING LABELS FOR DEEP AUTOENCODERS EMPLOYED FOR ANOMALY DETECTION

(71) Applicant: SAP SE, Walldorf (DE)

(72) Inventor: Stefan Kain, Rauenberg (DE)

(73) Assignee: SAP SE, Walldorf (DE)

( * ) Notice: Subject to any disclaimer, the term of this patent is extended or adjusted under 35 U.S.C. 154(b) by 788 days.

(21) Appl. No.: 16/394,120

(22) Filed: Apr. 25, 2019

(65) Prior Publication Data
US 2020/0342329 A1 Oct. 29, 2020

(51) Int. Cl.
*G06N 3/08* (2023.01)
*G06N 3/04* (2023.01)
*G06N 3/088* (2023.01)

(52) U.S. Cl.
CPC ............... *G06N 3/088* (2013.01); *G06N 3/04* (2013.01)

(58) Field of Classification Search
CPC ...... G06N 3/04; G06N 3/0454; G06N 3/0481; G06N 3/088
See application file for complete search history.

(56) References Cited

U.S. PATENT DOCUMENTS

| 8,660,868 B2 | 2/2014 | Vogel et al. |
| 9,026,525 B2 | 5/2015 | Harren et al. |
| 2013/0079938 A1 | 3/2013 | Lee et al. |
| 2016/0146709 A1 | 5/2016 | Dey et al. |

OTHER PUBLICATIONS

Meidan et al. ("N-BaIoT-Tetwork-Based Detection of IoT Botnet Attacks Using Deep Autoencoders", IEEE Pervasive Computing, 2018, pp. 12-22) (Year: 2018).*
Dewancker et al. ("A Strategy for Ranking Optimization Methods using Multiple Criteria", JMLR: Workshop and Conference Proceedings 64, 2016, pp. 11-20), (Year: 2016).*
Raschka et al. ("Model Evaluation, Mode Selection, and Algorithm Selection in Machine Learning", http://arxiv.org/pdf/1811.12808v2.pdf, arXiv:1811.12808v2 [cs.LG], Dec. 3, 2018, pp. 1-49) (Year: 2018).*

(Continued)

*Primary Examiner* — Miranda M Huang
*Assistant Examiner* — Robert Lewis Kulp
(74) *Attorney, Agent, or Firm* — Fish & Richardson P.C.

(57) ABSTRACT

Methods, systems, and computer-readable storage media for defining an autoencoder architecture including a neural network, during training of the autoencoder, recording a loss value at each iteration to provide a plurality of loss values, the autoencoder being trained using a data set that is associated with a domain, and a learning rate to provide a trained autoencoder, calculating a penalty score using at least a portion of the plurality of loss values, the penalty score being based on a loss span penalty $P_{LS}$, a convergence penalty $P_C$, and a fluctuation penalty $P_F$, comparing the penalty score P to a threshold penalty score to affect a comparison, and selectively employing the trained autoencoder for anomaly detection within the domain based on the comparison.

20 Claims, 11 Drawing Sheets

(56) References Cited

OTHER PUBLICATIONS

Mazzoni et al. ("Active Learning in the Presence of Unlabelable Examples", Jet Propulsion Laboratory, 2004, pp. 1-12) (Year: 2004).*
Cui et al. ("MLtuner: System Support for Automatic Machine Learning Tuning", CMJ-PDL-16-108, Parallel Data Laboratory, Carnegie Mellon University, Oct. 2016, pp. 1-23) (Year: 2016).*
Langkvist et al. ("A review of unsupervised feature learning and deep learning for time-series modeling", Pattern Recognition Letters 42, 2014, pp. 11-24 (Year: 2014).*
Bowen Baker ("Towards Practical Neural Network Meta-Modeling", Master's Thesis, MIT, Sep. 2017, pp. 1-73) (Year: 2017).*
U.S. Appl. No. 15/463,601, filed Mar. 20, 2017, Meusel et al.
U.S. Appl. No. 16/049,287, filed Jul. 30, 2018, Tauschinsky et al.

* cited by examiner

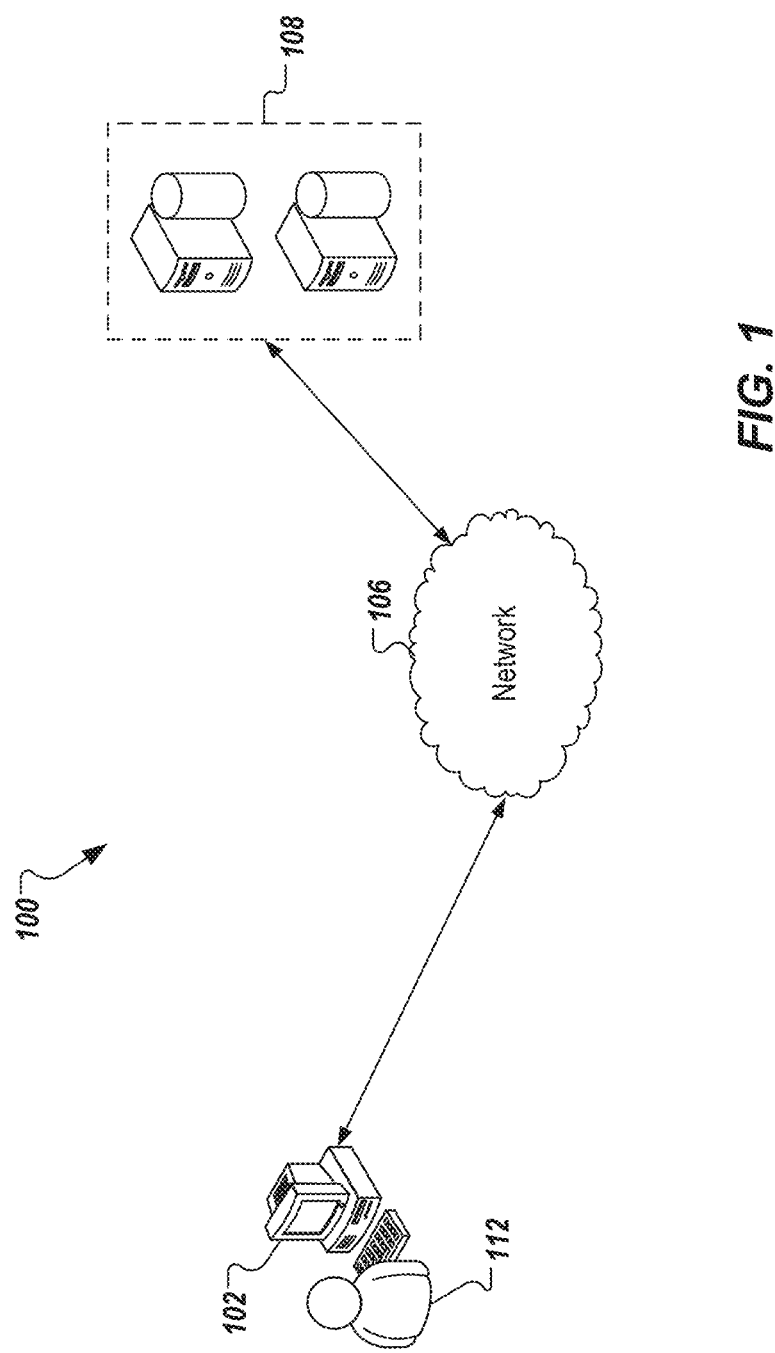

ARCHITECTURE SEARCH WITHOUT USING LABELS FOR DEEP AUTOENCODERS EMPLOYED FOR ANOMALY DETECTION

BACKGROUND

The terms Internet-of-Things (IoT), and big data reflect the modern world of connected devices, and massive amounts data that are generated by these devices. Example reasons for the growth of big data is the desire to gain more insights on actual usage and operational condition of the IoT devices, the decentralized orchestration for service provisioning, early replacement of soon-to-fail devices, higher degree of automation, more seamless semi-automated operation, and reduction of maintenance costs. One common trait of the data generated by IoT devices is the lack of labels.

Unlike the recent successes in image classification, where vast amounts of labeled data are for example voluntarily provided (e.g., by users of social networks), sensor data of highly intricate machinery requires expert knowledge to properly classify and label it. These human expert resources are expensive (e.g., electrical engineers, mechanical engineer). Labeled data can be used for supervised training of machine-learning (ML) models (e.g., neural networks). In the view the lack of labeled data in domains, such as IoT, training of ML models can be a more complicated proposition. This is particularly true in training ML models to detect anomalous conditions (e.g., conditions that more rarely occur, and there is less data available for).

SUMMARY

Implementations of the present disclosure are directed to evaluating neural networks for anomaly detection. More particularly, implementations of the present disclosure are directed to a penalty score for evaluating neural networks for anomaly detection based on patterns in training behavior of the neural networks.

In some implementations, actions include defining an autoencoder architecture including a neural network, during training of the autoencoder, recording a loss value at each iteration to provide a plurality of loss values, the autoencoder being trained using a data set that is associated with a domain, and a learning rate to provide a trained autoencoder, calculating a penalty score using at least a portion of the plurality of loss values, the penalty score being based on a loss span penalty $P_{LS}$, a convergence penalty $P_C$, and a fluctuation penalty $P_F$, comparing the penalty score P to a threshold penalty score to affect a comparison, and selectively employing the trained autoencoder for anomaly detection within the domain based on the comparison. Other implementations of this aspect include corresponding systems, apparatus, and computer programs, configured to perform the actions of the methods, encoded on computer storage devices.

These and other implementations can each optionally include one or more of the following features: the loss span penalty $P_{LS}$ is calculated as a minimum of a smoothed loss divided by a maximum of the smoothed loss, the smoothed loss being determined based on the plurality of loss values; determining the convergence penalty $P_C$ includes: selecting an interval of iterations, over which loss values in the plurality of loss are each below a threshold loss, determining a number of iterations in the interval of iterations, and calculating the convergence penalty $P_C$ as the quotient of the number of iterations and a total number of iterations in training of the autoencoder; the fluctuation penalty $P_F$ is determined as a difference between a maximum of a loss residual and the minimum of the loss residual, the loss residual being determine as a difference between a smoothed loss and the plurality of loss values; for training of the autoencoder, the data set is randomly divided into a training sub-set, and a validation sub-set; defining the auto-encoder architecture at least partially includes providing a number of hidden layers of the neural network, and a size of each hidden layer; and employing the trained autoencoder for anomaly detection includes processing a data stream from one or more Internet-of-Things (IoT) devices that monitor an environment to selectively detect in anomalous condition within the environment.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 1 depicts an example architecture that can be used to execute implementations of the present disclosure.

DETAILED DESCRIPTION

Figure 2A:
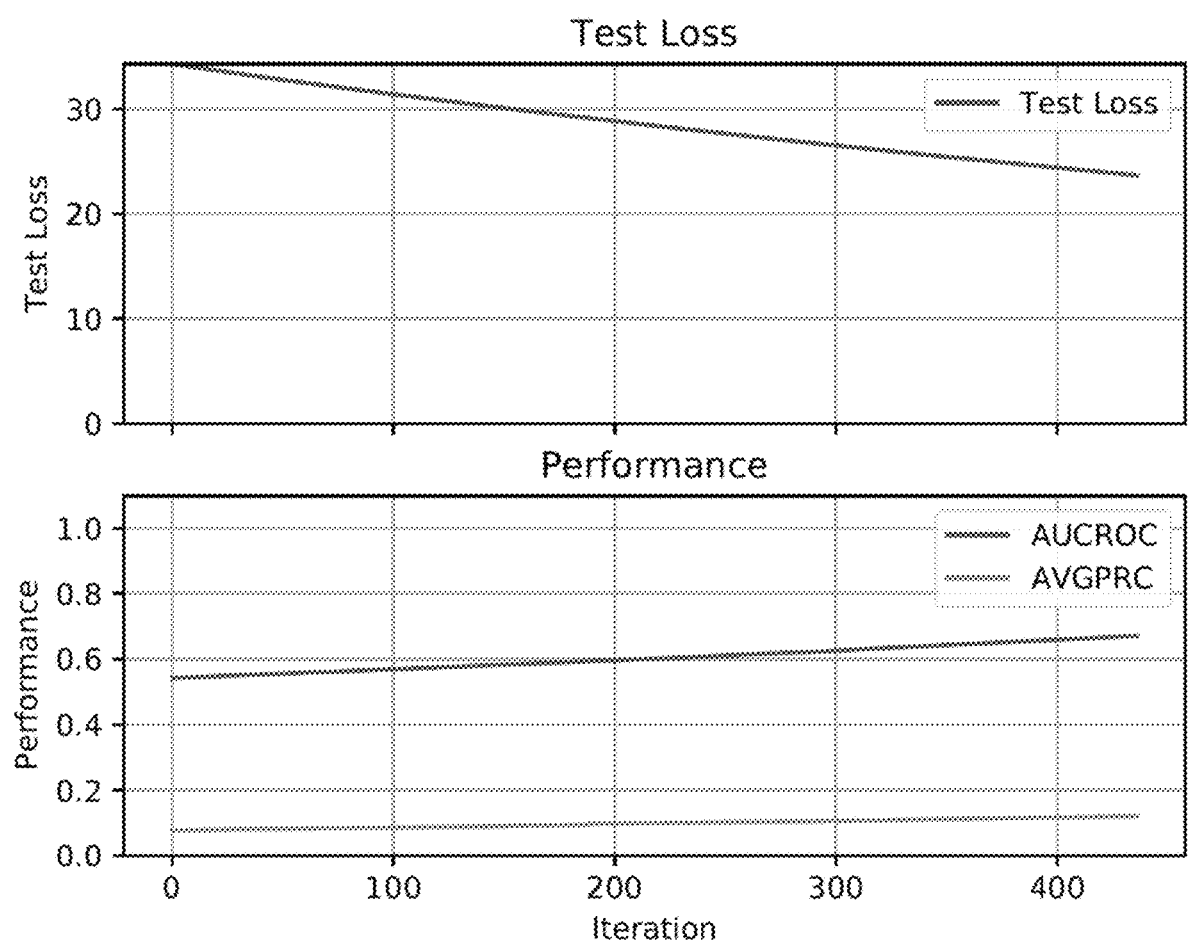
FIGS. 2A and 2B depict examples of learning rates.

Implementations of the present disclosure are directed to evaluating neural networks for anomaly detection. More particularly, implementations of the present disclosure are directed to a penalty score for evaluating neural networks for anomaly detection based on patterns in training behavior of the neural networks. Implementations can include actions of defining an autoencoder architecture including a neural network, during training of the autoencoder, recording a loss value at each iteration to provide a plurality of loss values, the autoencoder being trained using a data set that is associated with a domain, and a learning rate to provide a trained autoencoder, calculating a penalty score using at least a portion of the plurality of loss values, the penalty score being based on a loss span penalty $P_{LS}$, a convergence penalty $P_C$, and a fluctuation penalty $P_F$, comparing the penalty score P to a threshold penalty score to affect a comparison, and selectively employing the trained autoencoder for anomaly detection within the domain based on the comparison.

To provide further context for implementations of the present disclosure, and as introduced above, ML models can be used to process data from IoT devices (e.g., sensor streams) to determine whether an anomalous condition exists. However, training such ML models can be challenging. For example, supervised training requires labeled training data. In particular IoT domains, labeled training data can be lacking, as it can require human experts to label the training data. In general, anomaly detection can be described as the process of identifying unexpected items or events in datasets (e.g., streaming data from IoT devices), which differ from normal conditions. In contrast to standard classification tasks, anomaly detection is often applied on unlabeled data, taking only the internal structure of the dataset into account. Data representative of anomalous conditions can be sparse. That is, by definition, anomalous conditions occur less frequently resulting in a relatively smaller body of data.

In some instances, unsupervised autoencoders are trained only on negative data, which renders the algorithm semi-supervised. Although the autoencoder sees no labels directly, someone (e.g., a human expert) has to classify the data beforehand into normal conditions, and anomalous conditions. In some instances, autoencoders are trained on data that includes both negative and positive examples. In such instances, however, the performance of the resulting ML model is evaluated with labels in order to choose hyperparameters like the network dimension, the learning rate or the regularization which constitutes information leakage of labels into the machine learning process.

Such examples, however, do not reflect the practical experience and necessities for practical application of ML models in anomaly detection. For example, vast amounts of sensor data from IoT-enabled devices can be provided, however, there is a dearth of labeled training data to effectively train an ML model based thereon. Further, none of the example approaches above satisfy the requirement of genuine unsupervised training. Having no labeled training data entails that ML models cannot be reliably compared against each other. Further, in order to be useful in practice, labeled data should not be used during training, testing and validation. This is difficult, and it is hard to resist the temptation to handpick ML models that perform particularly well on a set of labeled training data. In practice, however, this luxury is not afforded. Accordingly, it can be broadly stated that anomaly detection using ML models (e.g., neural networks) suffers from the lack of labels for architecture optimization.

In view of this, implementations of the present disclosure identify a need to preprocess the data stream in a fully unsupervised fashion. The goal is to broadly divide the data into the regular behavior (normal conditions) on the one hand, and the rare events (anomalous conditions) on the other. In particular, it should be discernable as to which anomalies should be inspected by human experts. These can be referred to respectively as an unsupervised anomaly detection task, and a novelty detection task.

Further in view of the above context, implementations of the present disclosure provide systems and methods for determining neural network (e.g., auto-encoder) architectures, and/or training without using labels. More particularly, and as described in further detail herein, implementations of the present disclosure extract features from the learning behavior of the neural network and use a scoring technique on the features to derive a quality measure. In some examples, the quality measure represents a quality of training that is correlated to the future task of anomaly detection. In this manner, implementations of the present disclosure solve the anomaly detection task with neural networks fully unsupervised (i.e., without labeled training data).

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 104 can host a ML platform for evaluating training of neural networks and indicate a neural networks that may provide sufficient performance for anomaly detection.

In accordance with implementations of the present disclosure, a training evaluation platform monitors a training process of ML models to determine candidate ML models for anomaly detection in an IoT domain. More particularly, the present disclosure provides a training evaluation platform that can automatically predict an appropriate network size, architecture, learning rate, and/or regularization that performs well for anomaly detection on a given data set without utilizing labeled training data. As described in further detail herein, implementations of the present disclosure explore the space of hyperparameters and analyze their influence on the performance of neural networks for anomaly detection to find patterns in non-labeled date (e.g., patterns in features of the learning process itself and derived features thereof) that indicate suitable performance without actually utilizing the labels.

Implementations of the present disclosure also explore how volatile the performance of the neural network is dependent on varying hyperparameters or different random number states for initializing the weights before training starts. For example, determining whether there are architecture sizes and/or learning rates that lead to a smaller spread in performance for independently initialized networks than other hyperparameters. In short, implementations of the present disclosure provide a so-called sweet spots of robustness and performance without resorting to labeled training data.

In the domain of machine-learning, the term deep learning generally refers to learning a hierarchy of feature detectors that build on each other, usually by means of deeply layered, artificial neural networks. The term autoencoders refer to an artificial neural network that learns to approximate an input by reconstructing the input from a (possibly sparse) narrow representation with fewer degrees of freedom. Typically, this is achieved by nesting neuron layers with fewer and fewer neurons until a narrow gap is reached, through which all the information must flow. A set of widening layers, decoding layer, is stacked on the encoding layer until the last layer has the same number of output neurons as the input layer of the feed-forward network.

In further detail, an autoencoder reconstructs an input through an encoder function ($f$) that provides a learned representation ($h=f(x)$) of an example (x), and a decoder function (g). The autoencoder learns, such that $g(f(x)) \approx x$ for most samples of x. Neural networks are always trained in a supervised fashion, where a set of non-labeled training data can be split into a training sub-set (e.g., data used to train the neural network), and a training sub-set (e.g., data used to evaluate the output of the trained neural network). Autoencoders use the input as a target signal. In order to avoid learning a trivial identity function, one or more example techniques can be used. Example techniques include, without limitation, a narrow gap (or funnel), and distorting the input signal by random noise and still expecting the autoencoder to learn the original signal.

As described in further detail herein, implementations of the present disclosure use a loss of the autoencoder as a measure of how rarely/frequently a particular signal pattern was seen during the training phase. Rare signals leave less of a footprint behind in the network, while the common, frequent signals predominantly shape the loss landscape of the deep autoencoder.

Implementations of the present disclosure user a published set of unsupervised anomaly detection algorithms tested on multiple, different data sets, which data sets are also publicly available. Table 1, below, provides a summary of the data sets:

TABLE 1

Example Data Sets

| Data Set | Size | Dimensions | Outliers | Percentage |
|---|---|---|---|---|
| b-cancer | 367 | 30 | 10 | 2.72 |
| pen-global | 809 | 16 | 90 | 11.10 |
| letter | 1600 | 32 | 100 | 6.25 |
| speech | 3686 | 300 | 400 | 1.65 |
| satellite | 5100 | 36 | 75 | 1.49 |
| pen-local | 6724 | 16 | 10 | 0.15 |
| annthyroid | 6916 | 21 | 250 | 3.61 |

TABLE 1-continued

Example Data Sets

| Data Set | Size | Dimensions | Outliers | Percentage |
|---|---|---|---|---|
| shuttle | 46464 | 9 | 878 | 1.89 |
| aloi | 50000 | 27 | 1508 | 3.02 |

For each of the data sets, a series of deep autoencoders with different network architectures were trained for the cross-product of the listed learning rates, loss functions and dropout regularization in Table 2:

TABLE 2

Example Learning Rates, Loss Functions, Dropout

| | |
|---|---|
| Learning Rates | $10^{-6}, 10^{-5}, 10^{-4}, 10^{-3}$ |
| Loss Functions | $l_1, l_2$ |
| Dropout Percentage | 0.0, 0.3, 0.5 |

Example loss functions can include, without limitation, a mean-absolute-difference, provided as $l_1$, between the model prediction and the training data, and a mean-squared-error, provided as $l_2$, between model prediction and actual training data. In some examples, $l_1$ losses are hard to optimize, because of the non-differentiability at the origin (x=0). Yet, modern Deep-Learning Optimizers, such as the Adam Optimizer, compute a moving average of the gradient signal and the gradient-squared (to the power of two for each coordinate), and thus alleviate the optimization problem. In some examples, each learning rate can be described as a hyperparameter that controls how much weights are adjusted within the neural network with respect the loss gradient (e.g., the results of the loss function during training). Example layer sizes for networks with 3 and 7 hidden layers are respectively listed in Table 3 (e.g., thirty-one 3-layer neural networks ($N_{3,1}, \ldots, N_{3,31}$)) and Table 4 (e.g., eight 7-layer neural networks ($N_{7,1}, \ldots, N_{7,8}$)):

TABLE 3

Layer sizes for networks with 3 hidden layers.

| Nr. | Dimensions | | |
|---|---|---|---|
| 1 | 16 | 8 | 16 |
| 2 | 32 | 8 | 32 |
| 3 | 32 | 16 | 32 |
| 4 | 64 | 8 | 64 |
| 5 | 64 | 16 | 64 |
| 6 | 64 | 32 | 64 |
| 7 | 128 | 16 | 128 |
| 8 | 128 | 32 | 128 |
| 9 | 128 | 64 | 128 |
| 10 | 256 | 16 | 256 |
| 11 | 256 | 32 | 256 |
| 12 | 256 | 64 | 256 |
| 13 | 256 | 128 | 256 |
| 14 | 512 | 16 | 512 |
| 15 | 512 | 32 | 512 |
| 16 | 512 | 64 | 512 |
| 17 | 512 | 128 | 512 |
| 18 | 512 | 256 | 512 |
| 19 | 1024 | 16 | 1024 |
| 20 | 1024 | 32 | 1024 |
| 21 | 1024 | 64 | 1024 |
| 22 | 1024 | 128 | 1024 |
| 23 | 1024 | 256 | 1024 |
| 24 | 1024 | 512 | 1024 |
| 25 | 2048 | 16 | 2048 |
| 26 | 2048 | 32 | 2048 |
| 27 | 2048 | 64 | 2048 |

TABLE 3-continued

Layer sizes for networks with 3 hidden layers.

| Nr. | Dimensions | | | |
|---|---|---|---|---|
| 28 | 2048 | 128 | 2048 | |
| 29 | 2048 | 256 | 2048 | |
| 30 | 2048 | 512 | 2048 | |
| 31 | 2048 | 1024 | 2048 | |

TABLE 4

Layer sizes for networks with 7 hidden layers.

| Nr. | Dimensions | | | | | | |
|---|---|---|---|---|---|---|---|
| 1 | 16 | 8 | 4 | 2 | 4 | 8 | 16 |
| 2 | 32 | 16 | 8 | 4 | 8 | 16 | 32 |
| 3 | 64 | 32 | 16 | 8 | 16 | 32 | 64 |
| 4 | 128 | 64 | 32 | 16 | 32 | 64 | 128 |
| 5 | 256 | 128 | 64 | 32 | 64 | 128 | 256 |
| 6 | 512 | 256 | 128 | 64 | 128 | 256 | 512 |
| 7 | 1024 | 512 | 256 | 128 | 256 | 512 | 1024 |
| 8 | 2048 | 1024 | 512 | 256 | 512 | 1024 | 2048 |

In some examples, each network layer is configured as a fully connected linear layer followed by batch normalization, rectified linear unit, and dropout operation, except for the linear output layer.

In some implementations, training of the neural networks is performed using a batch size of 128. In some examples, the learning rate is kept constant for each run. In some examples, each configuration is run up to 4 times with different initialization of the parameters for 50 epochs. This results in a total number of more than 15000 training runs. For each run a random train/test split of the data is performed (e.g., 70/30 split). That is, for each run, the test a set of non-labeled training data can be randomly split into a training sub-set (e.g. 70% of the set of non-labeled training data), and a test sub-set (e.g. 30% of the set of non-labeled training data). At each iteration during a run, the loss on the test set is calculated and stored.

In accordance with implementations of the present disclosure, the neural network's performance at detecting anomalies is measured for each iteration by sorting each data instance by decreasing reconstruction loss and determining the area under curve of the receiver operating characteristic curve (AUCROC). The AUCROC plots, for each ranking threshold, the true positives versus the false positives above the threshold. Further, precision and recall are calculated for each threshold and the average precision is determined (AVGPRC). AVGPRC is equivalent to the area under precision recall curve. In general, a precision recall curve summarizes the trade-off between the true positive rate and the positive predictive value for a predictive model using different probability thresholds.

Figure 2B:
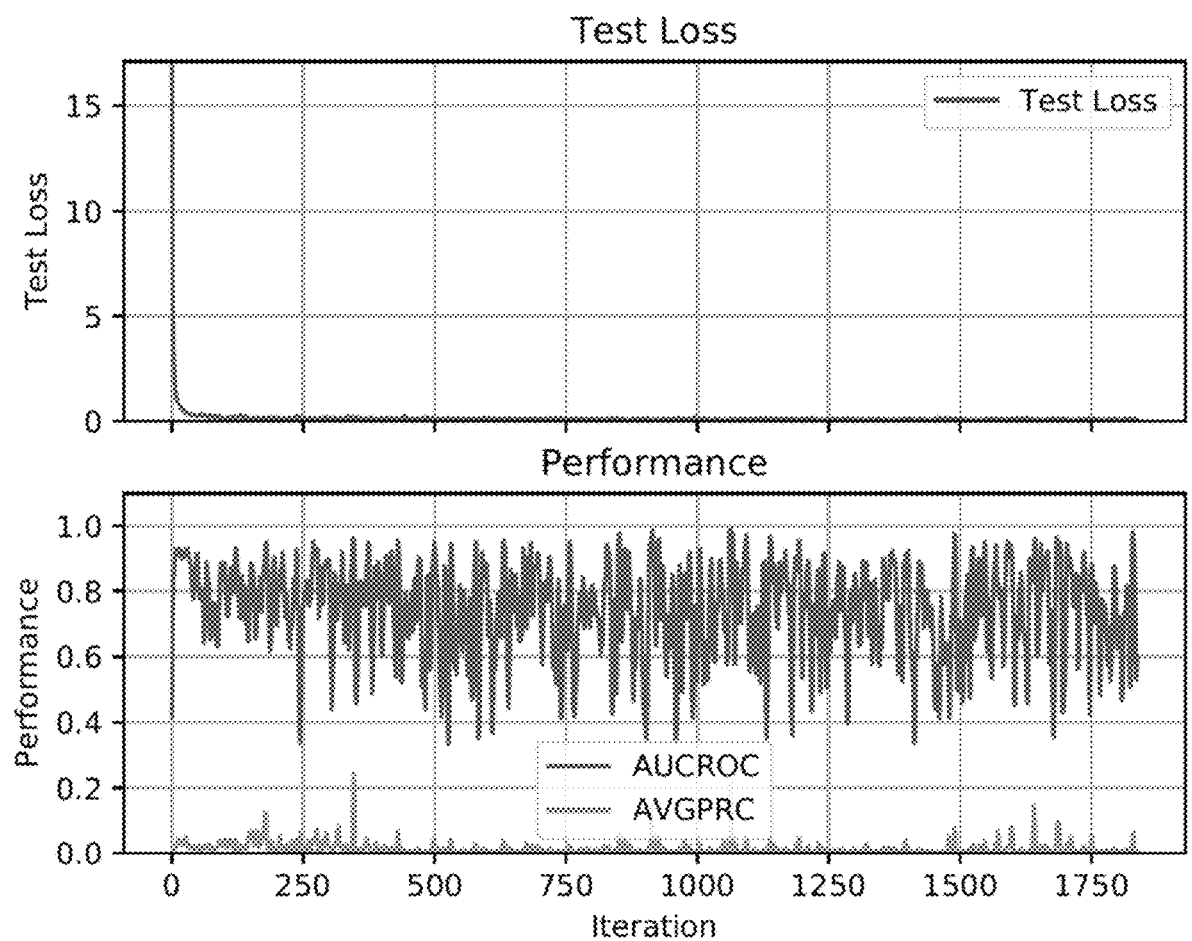
Figure 3A:
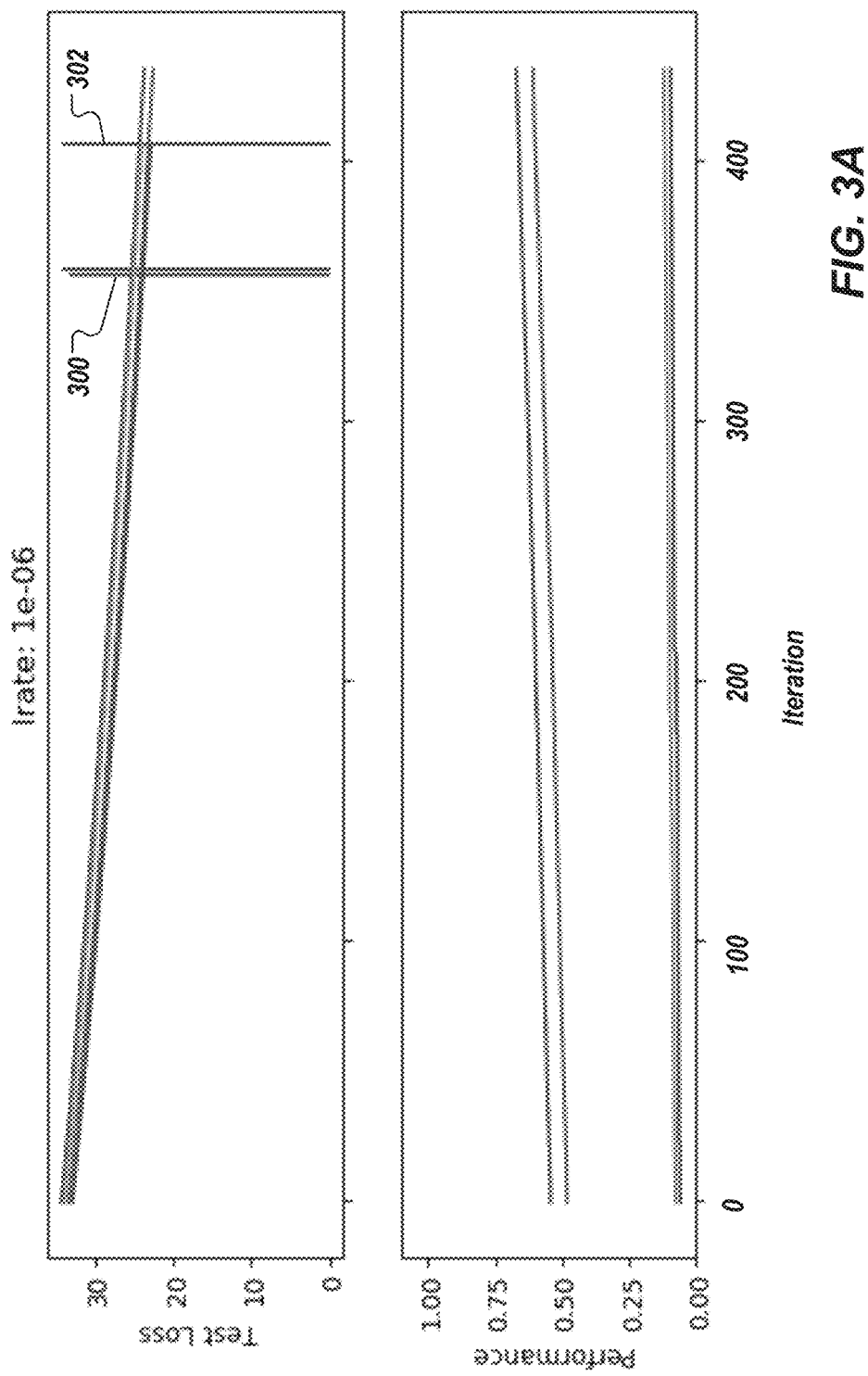
FIGS. 3A-3D depict the test loss history and performance metric per iteration for four different learning rates on two runs.
Figure 3B:
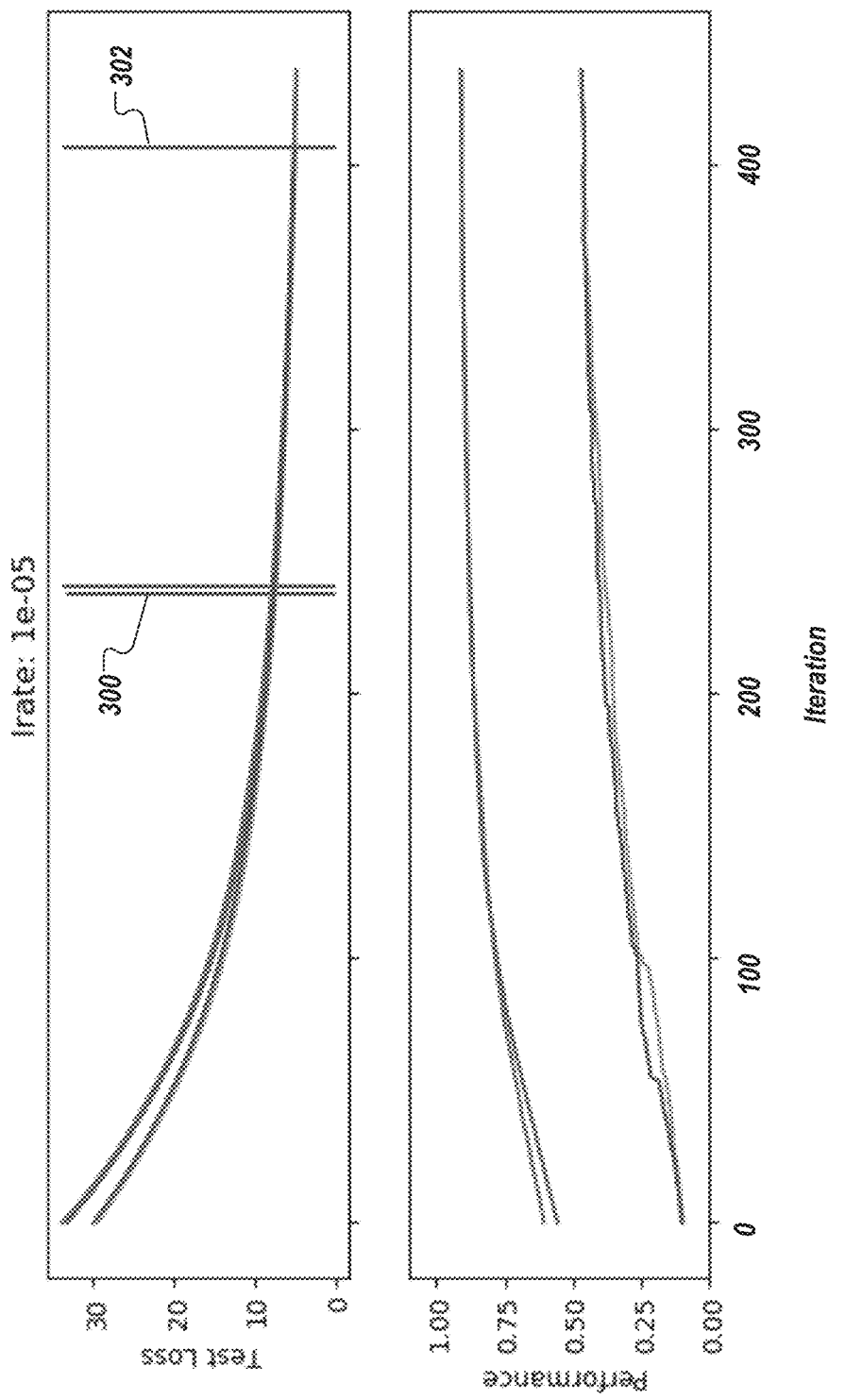
Figure 3C:
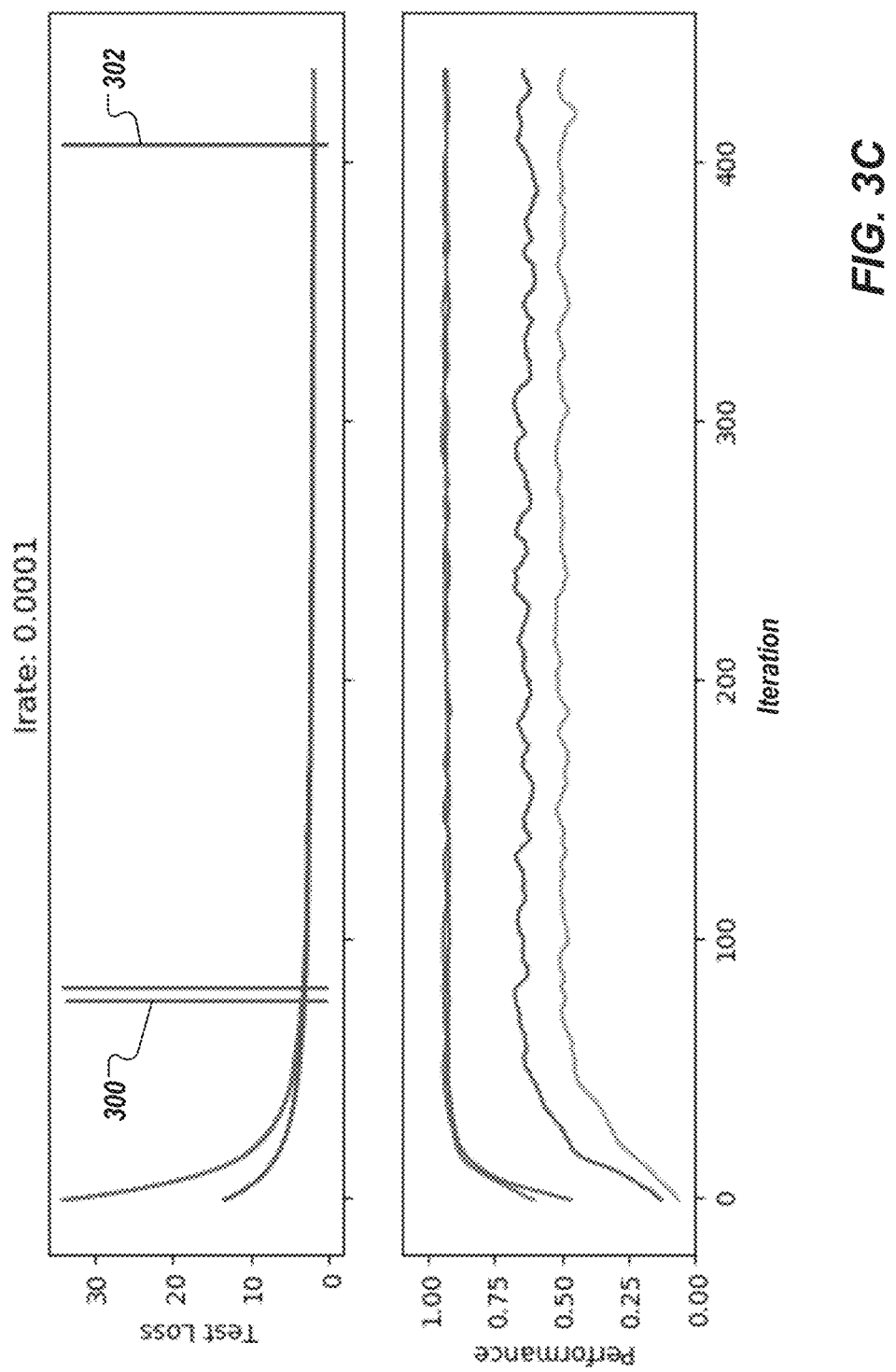
Figure 3D:
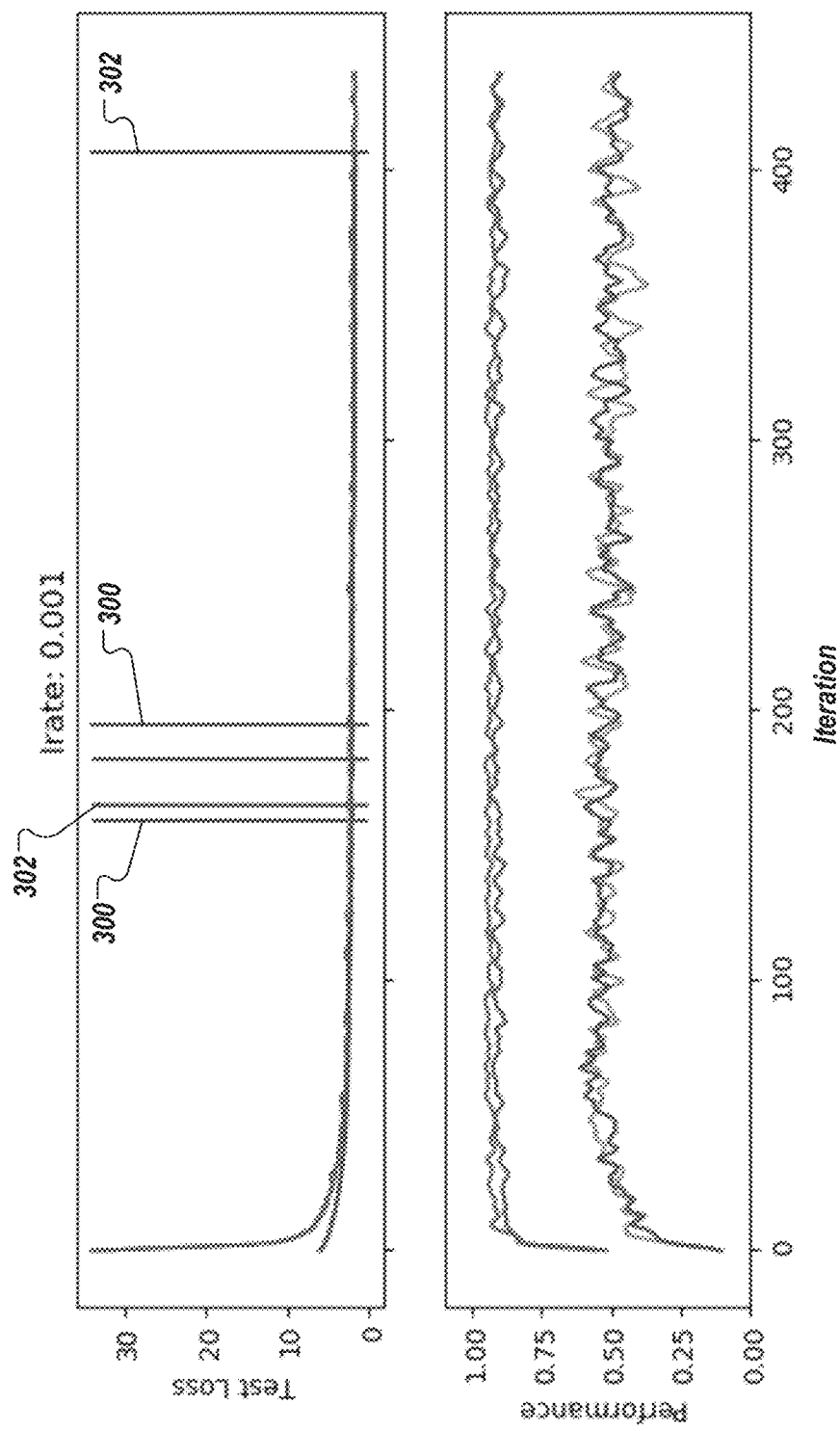

One challenge is to identify a scheme of automatically determining whether the learning curve indicated a good training run. It is determined that, for each data set and network size, the learning rate that has the biggest influence on the quality of the training. FIGS. 2A and 2B depicts examples of learning rates that neither fit to the data set nor to the network size. Too small of learning rates (FIG. 2A) let the training process converge very slowly, if at all. Too large of learning rates (FIG. 2B) lead to a very high fluctuation in the detection performance during the run. Accordingly, what is sought is a run that converges relatively quickly, while the detection performance fluctuates only little or not at all.

In view of this, implementations of the present disclosure provide a heuristic measure that assigns a penalty score to a particular (test) loss history of a run. In some examples, the loss is calculated on training and validation, and represents how well the neural network is doing for these training and validation sets (e.g., the training sub-set, and the validation sub-set discussed above). In some implementations, an interval of iterations is identified, in which the loss shows no further trend of decreasing, and a relatively low variation in the signal is provided. In further detail, for each loss history L (e.g., loss values recorded over training iterations), a smoothed loss $L_s$ is calculated using convolution with a Gaussian. Subtracting the smoothed loss $L_s$ from the original L yields a residual loss $L_r$. In this manner, the signal is split into a trend and short-term fluctuations.

In some implementations, a span S is determined as the difference between a maximum and a minimum of the smoothed test loss during training. All of the intervals of iteration indices, in which the smoothed test loss stays below a threshold (e.g., 10% of the span S) are identified. In some instances, there can be more intervals or the last interval does not coincide with the end of training, because the smoothed test loss might have wandered above the threshold again. This might occur due to overfitting (i.e., the autoencoder starts to become worse at reconstructing the test set), or the learning rate is so large that even the smoothed test loss oscillates above the threshold.

In accordance with implementations of the present disclosure, the penalty score P is provided, which represents relative anomaly detection performance of the autoencoder. In some implementations, the penalty score P includes multiple components: a loss span penalty $P_{LS}$, a convergence penalty $P_C$, and a fluctuation penalty $P_F$.

In some examples, loss span penalty $P_{LS}$, is provided as the minimum of the smoothed loss divided by the maximum of the smoothed loss. A value at or closer to 1 indicates that the training was barely able to reduce the test loss.

In some examples, the convergence penalty $P_C$, is provided as the length of the last interval, in which the test loss stays below the threshold divided by the total number of iterations. Accordingly, the convergence penalty $P_C$ is provided as a number between 0 and 1. A value at or nearer to 0 indicates that the network reached low losses very rapidly, while a value at or closer to 1 means that the network is either learning very slowly, or the network started overfitting or fluctuating, which all are causes that make the last interval shorter.

In some examples, the fluctuation penalty $P_F$ is determined as the difference between the maximum of the test loss residual and the minimum of the test loss residual. The fluctuation penalty $P_F$ is normalized after all runs with equal hyperparameter and varying learning rates have completed, and the maximum fluctuation penalty $P_{F,max}$ has been determined. All fluctuation penalties are then normalized by the maximum fluctuation penalty $P_{F,max}$. In this manner, the fluctuation penalty $P_F$ is between 0 and 1.

In some implementations, the loss span penalty $P_{LS}$, the convergence penalty $P_C$, and the fluctuation penalty $P_F$ are combined into the penalty score P. In some examples, the penalty score P is provided as a weighted sum of the loss span penalty $P_{LS}$, the convergence penalty $P_C$, and the fluctuation penalty $P_F$. For example:

$$P = \alpha P_{LS} + \beta P_C + \gamma P_F$$

where $\alpha$, $\beta$, and $\gamma$ are experimentally selected weights (e.g., 0.25, 0.25, 0.5, respectively). In accordance with implementations of the present disclosure, the penalty score P, which is a derived feature from the test loss history, as described herein, can be used to discern which autoencoder configurations are good candidates for anomaly detection. In some examples, a lower penalty score indicates that the model's learning curve shows better characteristics (e.g., good reduction of loss and low fluctuation in the region of saturation). In some examples, a threshold is determined by creating a histogram of the achieved penalties over all trained models and taking the lowest 10%.

Instead of doing a "stupid" scanning of the hyperparameter space (nested loop for each hyper parameter), implementations of the present disclosure sample the hyperparameter space randomly and provide unbiased estimated histogram after a particular percentage (e.g., 25%) of all possible hyperparameter combinations. This unbiased histogram is used to derive a threshold value. In some examples, this histogram is also used to tune the random selection process (from a gaussian for example) to focus more on areas of the hyperparameter space that are more promising (having lower penalty scores than the average).

FIGS. 3A-3D depict the test loss history and performance metric per iteration for four different learning rates on two runs using the letter data set for an autoencoder configured as Nr. 8 from Table 4, above, using loss function $l_2$, and a dropout percentage of 0.0 (Table 2).

In FIGS. 3A-3D, the green and red vertical bars (300, 302, respectively) indicate the intervals where the smoothed test loss is below the threshold. In this example, the best anomaly detection performance was achieved with learning rate $10^{-4}$ (FIG. 3C), which results in the longest intervals for both shown runs. In the performance, plots the upper lines are the AUCROC and the lower lines are the AVGPRC. In the plot for the learning rate $10^{-3}$ (FIG. 3D), it can be seen that, as the last interval gets shorter and the fluctuation in the unsmoothed test loss history increases, the performance metrics start to fluctuate.

Figure 4A:
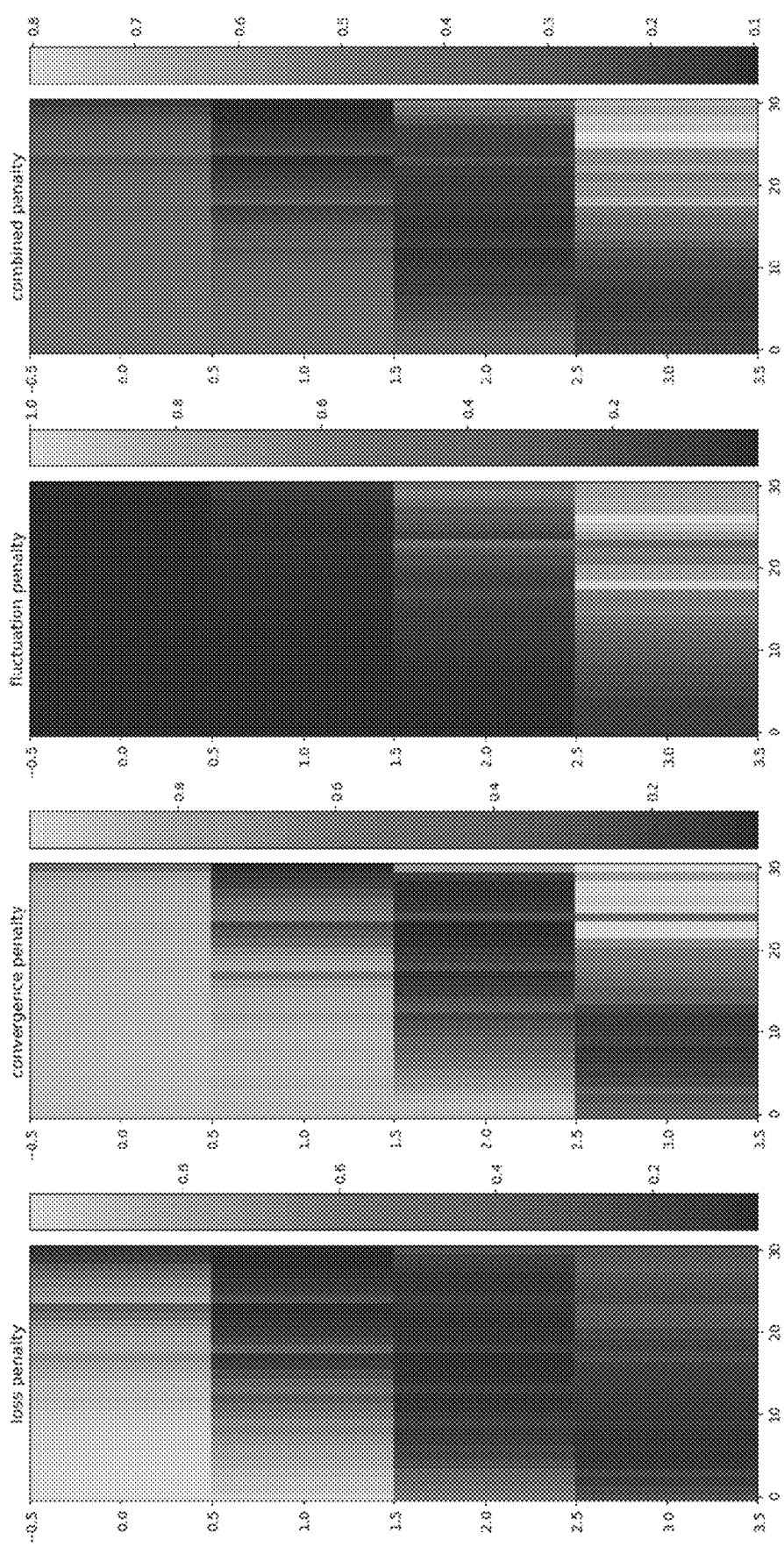
FIGS. 4A and 4B depict example visualizations of a penalty score, and respective sub-scores in accordance with implementations of the present disclosure.

FIG. 4A depicts an example visualization of a penalty score, and respective sub-scores in accordance with implementations of the present disclosure. The example visualization is based on the pen-local data set with neural networks having 3 hidden layers. FIG. 4A depicts three heat maps for each sub-penalty and their weighted combination on the right. The x-axis represents the network size. The y-axis represents the learning rates with $10^{-6}$ to $10^{-3}$ from top to bottom. It can be seen that similar detection performance can be achieved with large networks and small learning rate, or with small networks and correspondingly larger learning rate. It can also be seen that the region of low penalty scores is oriented diagonally from bottom left to top right. This pattern can be seen for almost all combinations of data sets, architectures and learning rates.

Figure 4B:
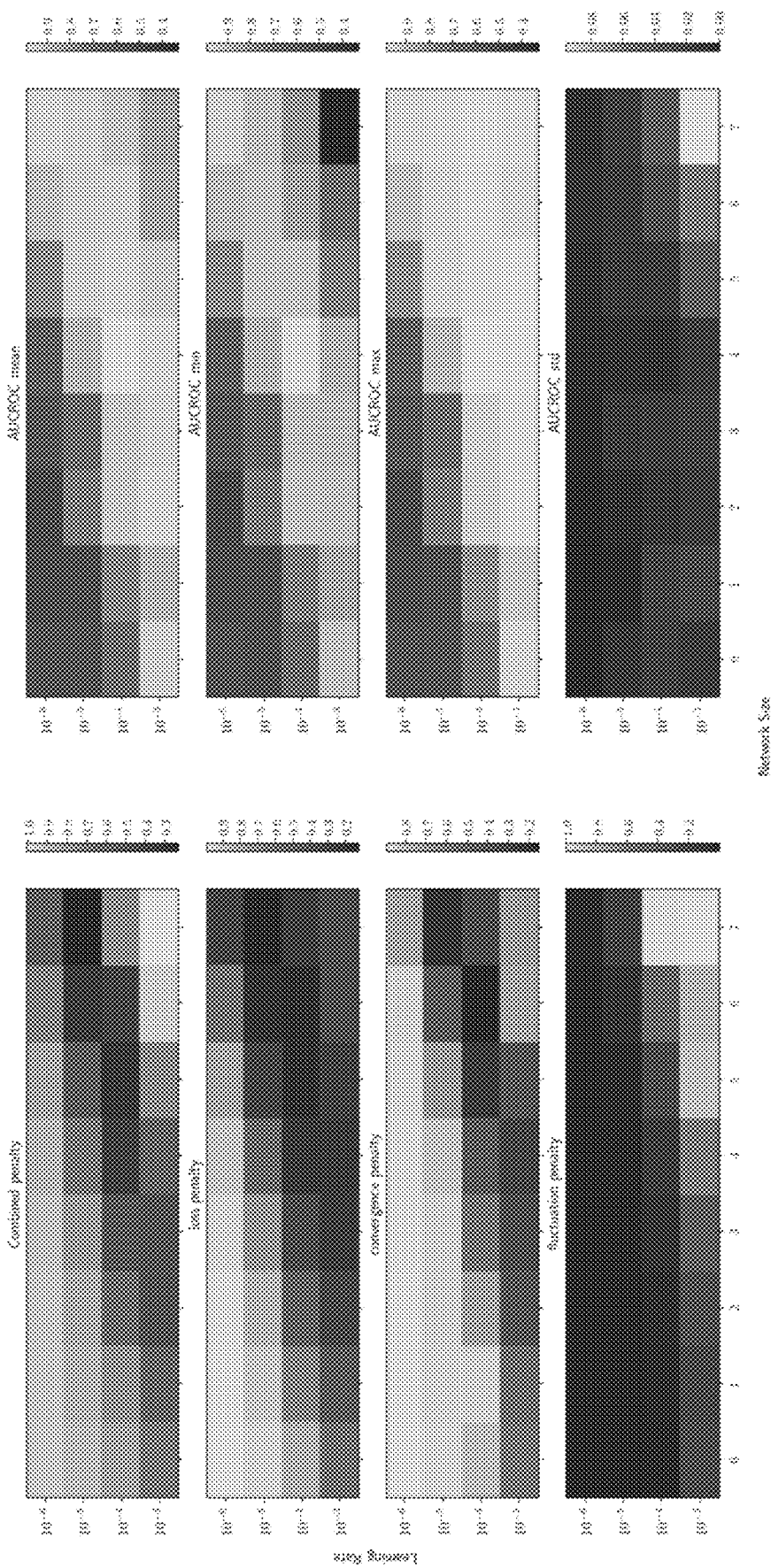

FIG. 4B depicts an example visualization of a penalty score, and respective sub-scores in accordance with implementations of the present disclosure. The example visualization is based on the pen-local data set with neural networks having 7 hidden layers. FIG. 4B depicts the penalties and combined penalty on the left and the performance, and respective variations on the right for all network sizes and learning rates. The anomaly ranking performance is possible over a wide range of network sizes, if the learning rate is adjusted accordingly. This trait is visible for almost all data sets.

The example visualizations of FIGS. 4A and 4B reveal the following example observations. For example, having a bottleneck of larger dimension than the data does not necessarily mean, that the network will perform badly. As another example, the network size can be the least sensitive parameter for determining the anomaly detection performance of a particular neural network. As another example, fine-tuning the learning rate is the can be used to successfully employ autoencoders as anomaly detectors. as another example, the feature engineered penalty score provides tremendous assistance in judging the stability of the training, as looking at 15000 individual learning curves turned out to be a non-sustainable endeavor.

Scanning an entire grid of hyperparameters can be very cost-intensive in terms of time, and computing resources. In view of this, implementations of the present disclosure provide for coordinate-wise descent. In some implementations, this is achieved by optimizing the learning rate coordinate with finite difference approximation to a meta-gradient or a bisection approach. When an optimal learning rate for the current architecture size is found, a meta-gradient approximation of the penalty score P is determined with respect to the network dimensions, or a bisection on the dimension parameters until a minimum in the score function is reached.

In further, and with regard to the meta-gradient approximating the penalty score P, the hyperparameter space can be provided as a multidimensional grid structure. The gradient along an axis can be approximated by leaving all parameters constant except one. Along this axis (e.g., learning rate) a step to the left and to the right can be made and respective penalty scores are be determined. A move is made in the direction of lower penalty until a point is reached, at which the penalty increases again. The next axis is considered (e.g., network dimension) and two penalty scores are computed. A move into the direction of lower penalty score is made, and so on. This is repeated for all dimensions until returning to the first dimension (e.g., learning rate). The process starts now at the beginning again until any further improvement in penalty scores can be obtained. The result is the best hyperparameter combination that can be found. Analysis (heatmaps) suggest that the behavior of the penalty function is convex. Consequently, one minimum is provided.

Figure 5:
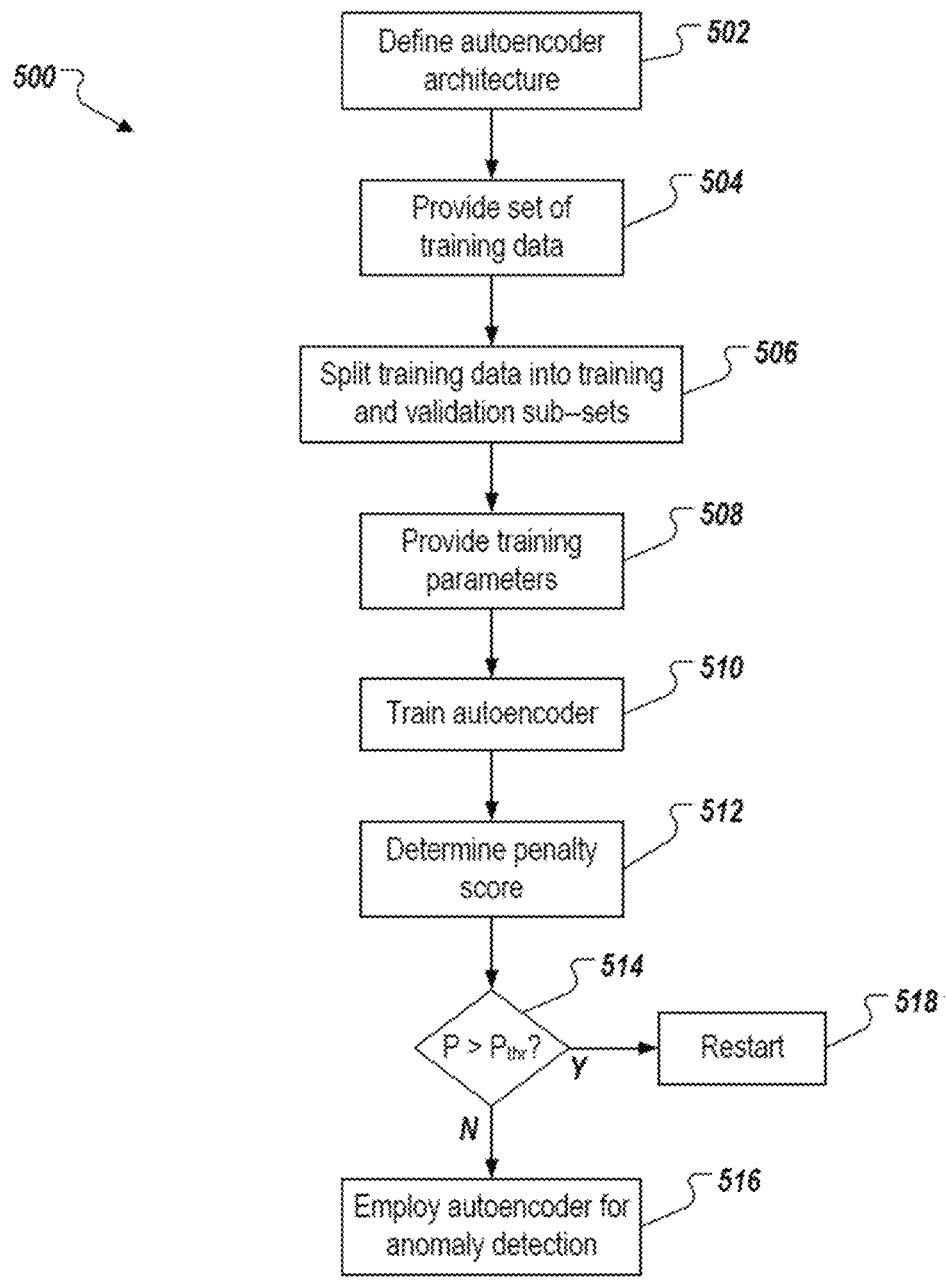
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

An autoencoder architecture including a neural network is defined (502). For example, a number of hidden layers, and respective sizes (e.g., number of neurons) in each hidden layer are defined. A set of training data is provided (504). For example, a set of training data that is representative of a particular domain can be provided. In some examples, the domain includes one or more IoT devices that monitor one or more environments (e.g., operation of a machine), where the training data is a data stream from the one or more IoT devices. In accordance with implementations of the present disclosure, the training data is unlabeled.

The set of training data is split into a training sub-set and a validation sub-set (506). For example, training data is randomly selected for inclusion in one of the training sub-set and the validation sub-set. Training parameters are provided (508). For example, for training of the autoencoder, a learning rate (e.g., $10^{-6}$, $10^{-5}$, $10^{-4}$, $10^{-3}$), a loss function (e.g., $l_1$, $l_2$), and a dropout percentage (e.g., 0.0, 0.3, 0.5) are each selected. The autoencoder is trained based on the training sub-set, the validation sub-set, and the training parameters (510). For example, a plurality of iterations of training are performed, during which loss values are recorded.

A penalty score P for the trained autoencoder is provided (512). It is determined whether the penalty score P exceeds a threshold penalty score $P_{thr}$ (514). If the penalty score P does not exceed the threshold penalty score $P_{thr}$, the trained autoencoder is employed for anomaly detection (516). If the penalty score P exceeds the threshold penalty score $P_{thr}$, the trained autoencoder does not provide sufficient performance for anomaly detection. Consequently, the example process 500 can restart (518) to provide a different autoencoder architecture, and/or different training parameters.

Figure 6:
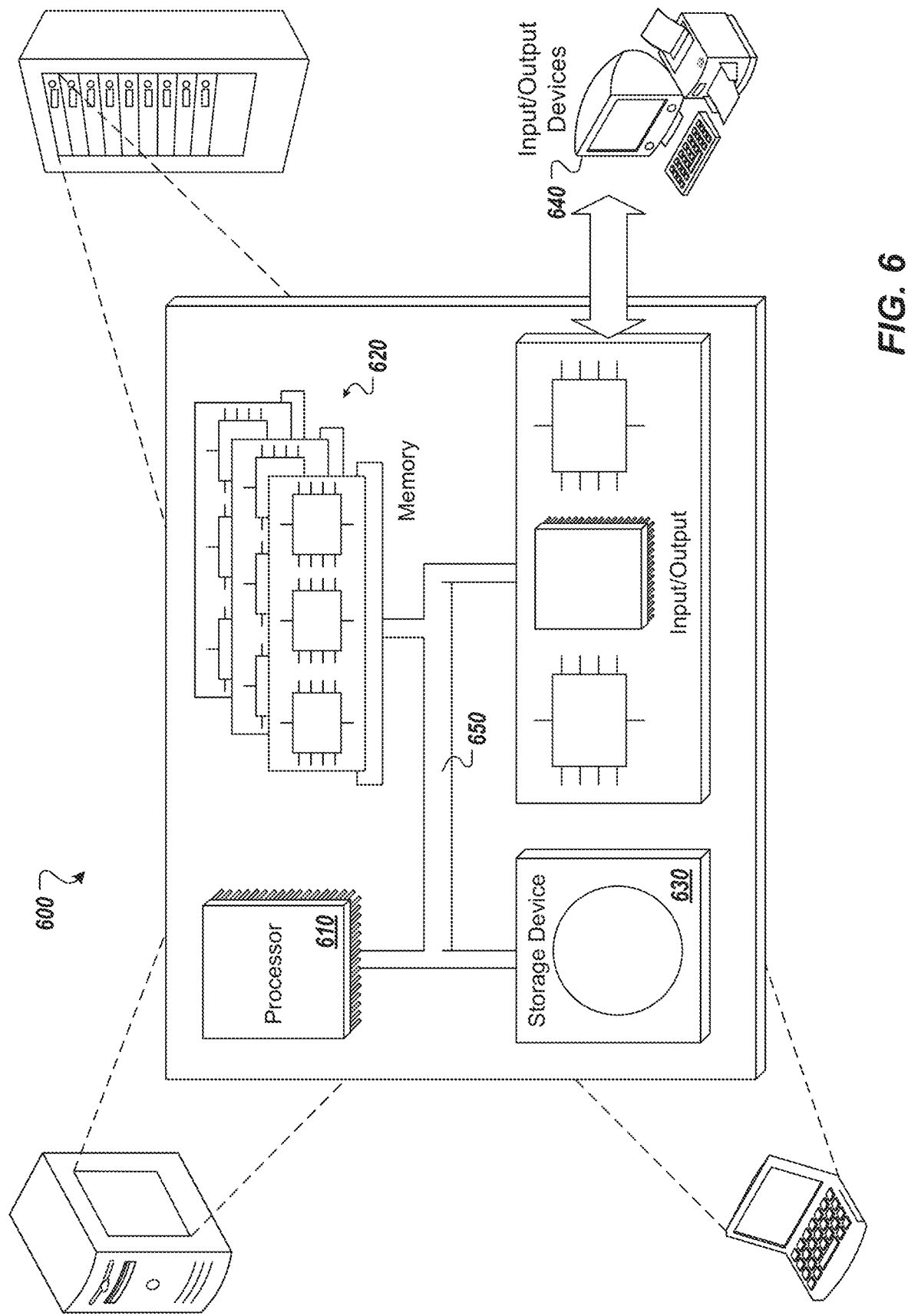
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selecting a machine-learning (ML) model for application in anomaly detection, the method being executed by one or more processors and comprising:

defining an autoencoder architecture comprising a neural network;

providing a data set for training of the autoencoder, an entirety of data in the set of training data being absent labels for training and representing normal conditions and anomalous conditions within a domain;

defining a set of trained autoencoders by, for each hyperparameter set in a set of hyperparameter sets:

training the autoencoder using the hyperparameter set and the set of training data, wherein during training of the autoencoder, a loss value is recorded at each iteration to provide a plurality of loss values, the autoencoder being trained using the data set and a learning rate included in the hyperparameter set to provide a trained autoencoder for inclusion in the set of trained autoencoders, calculating a penalty score using at least a portion of the plurality of loss values, the penalty score representing relative anomaly detection performance of the autoencoder and being based on a loss span penalty $P_{LS}$, a convergence penalty $P_C$, and a fluctuation penalty $P_F$, storing the penalty score in a multi-dimensional grid structure representing a hyperparameter space of the autoencoder;

scanning penalty scores stored in the multi-dimensional grid structure using a meta-gradient to determine a minimum penalty score;

selecting a trained autoencoder from the set of trained autoencoders as a selected trained autoencoder, the selected trained autoencoder having a hyperparameter set resulting in the minimum penalty score; and employing the selected trained autoencoder for anomaly detection within the domain based on the comparison.

2. The method of claim 1, wherein the loss span penalty $P_{LS}$ is calculated as a minimum of a smoothed loss divided by a maximum of the smoothed loss, the smoothed loss being determined based on the plurality of loss values.

3. The method of claim 1, wherein determining the convergence penalty $P_C$ comprises:

selecting an interval of iterations, over which loss values in the plurality of loss are each below a threshold loss;

determining a number of iterations in the interval of iterations; and calculating the convergence penalty $P_C$ as the quotient of the number of iterations and a total number of iterations in training of the autoencoder.

4. The method of claim 1, wherein the fluctuation penalty $P_F$ is determined as a difference between a maximum of a loss residual and the minimum of the loss residual, the loss residual being determined as a difference between a smoothed loss and the plurality of loss values.

5. The method of claim 1, wherein, for training of the autoencoder, the data set is randomly divided into a training sub-set, and a validation sub-set.

6. The method of claim 1, wherein defining the autoencoder architecture at least partially comprises providing a number of hidden layers of the neural network, and a size of each hidden layer.

7. The method of claim 1, wherein employing the selected trained autoencoder for anomaly detection comprises processing a data stream from one or more Internet-of-Things (IoT) devices that monitor an environment to selectively detect an anomalous condition within the environment.

8. A non-transitory computer-readable storage medium coupled to one or more processors and having instructions stored thereon which, when executed by the one or more processors, cause the one or more processors to perform operations for selecting a machine-learning (ML) model for application in anomaly detection, the operations comprising:

providing a data set for training of the autoencoder, an entirety of data in the set of training data being absent labels for training and representing normal conditions and anomalous conditions within a domain;

defining a set of trained autoencoders by, for each hyperparameter set in a set of hyperparameter sets:

training the autoencoder using the hyperparameter set and the set of training data, wherein during training of the autoencoder, a loss value is recorded at each iteration to provide a plurality of loss values, the autoencoder being trained using the data set and a learning rate included in the hyperparameter set to provide a trained autoencoder for inclusion in the set of trained autoencoders, calculating a penalty score using at least a portion of the plurality of loss values, the penalty score representing relative anomaly detection performance of the autoencoder and being based on a loss span penalty $P_{LS}$, a convergence penalty $P_C$, and a fluctuation penalty $P_F$, storing the penalty score in a multi-dimensional grid structure representing a hyperparameter space of the autoencoder;

scanning penalty scores stored in the multi-dimensional grid structure using a meta-gradient to determine a minimum penalty score;

selecting a trained autoencoder from the set of trained autoencoders as a selected trained autoencoder, the selected trained autoencoder having a hyperparameter set resulting in the minimum penalty score; and employing the selected trained autoencoder for anomaly detection within the domain based on the comparison.

9. The computer-readable storage medium of claim 8, wherein the loss span penalty $P_{LS}$ is calculated as a minimum of a smoothed loss divided by a maximum of the smoothed loss, the smoothed loss being determined based on the plurality of loss values.

10. The computer-readable storage medium of claim 8, wherein determining the convergence penalty $P_C$ comprises:

selecting an interval of iterations, over which loss values in the plurality of loss are each below a threshold loss;

determining a number of iterations in the interval of iterations; and calculating the convergence penalty $P_C$ as the quotient of the number of iterations and a total number of iterations in training of the autoencoder.

11. The computer-readable storage medium of claim 8, wherein the fluctuation penalty $P_F$ is determined as a difference between a maximum of a loss residual and the minimum of the loss residual, the loss residual being determined as a difference between a smoothed loss and the plurality of loss values.

12. The computer-readable storage medium of claim 8, wherein, for training of the autoencoder, the data set is randomly divided into a training sub-set, and a validation sub-set.

13. The computer-readable storage medium of claim 8, wherein defining the auto-encoder architecture at least partially comprises providing a number of hidden layers of the neural network, and a size of each hidden layer.

14. The computer-readable storage medium of claim 8, wherein employing the selected trained autoencoder for anomaly detection comprises processing a data stream from one or more Internet-of-Things (IoT) devices that monitor an environment to selectively detect an anomalous condition within the environment.

15. A system, comprising:
a computing device; and
a computer-readable storage device coupled to the computing device and having instructions stored thereon which, when executed by the computing device, cause the computing device to perform operations for selecting a machine-learning (ML) model for application in anomaly detection, the operations comprising:
- defining an autoencoder architecture comprising a neural network;
- providing a data set for training of the autoencoder, an entirety of data in the set of training data being absent labels for training and representing normal conditions and anomalous conditions within a domain;
- defining a set of trained autoencoders by, for each hyperparameter set in a set of hyperparameter sets:
  - training the autoencoder using the hyperparameter set and the set of training data, wherein during training of the autoencoder, a loss value is recorded at each iteration to provide a plurality of loss values, the autoencoder being trained using the data set and a learning rate included in the hyperparameter set to provide a trained autoencoder for inclusion in the set of trained autoencoders,
  - calculating a penalty score using at least a portion of the plurality of loss values, the penalty score representing relative anomaly detection performance of the autoencoder and being based on a loss span penalty $P_{LS}$, a convergence penalty $P_C$, and a fluctuation penalty $P_F$,
  - storing the penalty score in a multi-dimensional grid structure representing a hyperparameter space of the autoencoder;
- scanning penalty scores stored in the multi-dimensional grid structure using a meta-gradient to determine a minimum penalty score;
- selecting a trained autoencoder from the set of trained autoencoders as a selected trained autoencoder, the selected trained autoencoder having a hyperparameter set resulting in the minimum penalty score; and
- employing the selected trained autoencoder for anomaly detection within the domain based on the comparison.

16. The system of claim 15, wherein the loss span penalty $P_{LS}$ is calculated as a minimum of a smoothed loss divided by a maximum of the smoothed loss, the smoothed loss being determined based on the plurality of loss values.

17. The system of claim 15, wherein determining the convergence penalty $P_C$ comprises:
- selecting an interval of iterations, over which loss values in the plurality of loss are each below a threshold loss;
- determining a number of iterations in the interval of iterations; and
- calculating the convergence penalty $P_C$ as the quotient of the number of iterations and a total number of iterations in training of the autoencoder.

18. The system of claim 15, wherein the fluctuation penalty $P_F$ is determined as a difference between a maximum of a loss residual and the minimum of the loss residual, the loss residual being determined as a difference between a smoothed loss and the plurality of loss values.

19. The system of claim 15, wherein, for training of the autoencoder, the data set is randomly divided into a training sub-set, and a validation sub-set.

20. The system of claim 15, wherein defining the autoencoder architecture at least partially comprises providing a number of hidden layers of the neural network, and a size of each hidden layer.

* * * * *